April 18, 1967 R. C. DECHAINE ETAL 3,314,356
APPARATUS FOR PROCESSING PROTEIN FIBER
Original Filed Feb. 5, 1963 4 Sheets-Sheet 1
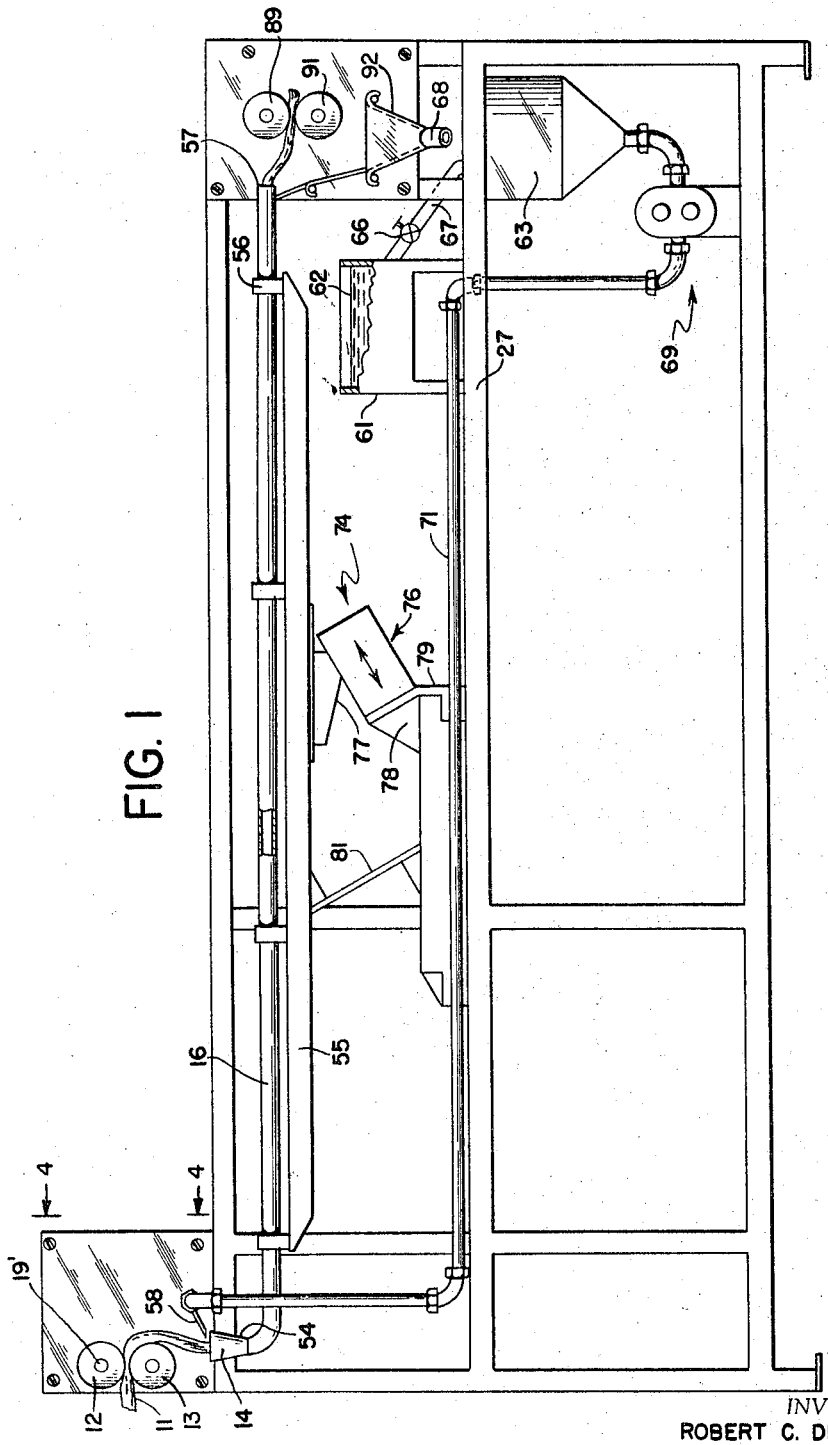
INVENTORS
ROBERT C. DECHAINE
ROBERT W. CALLAGHAN
BY
*Harold D. Jastrem*
ATTORNEY

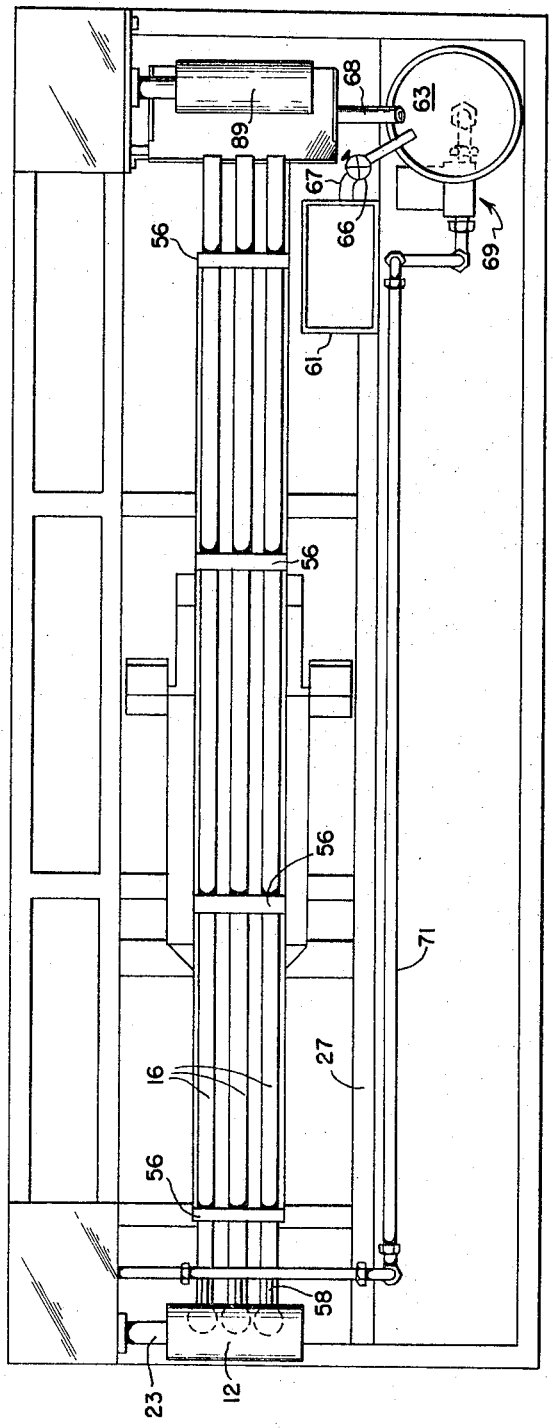
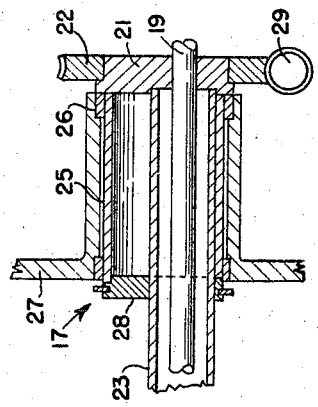

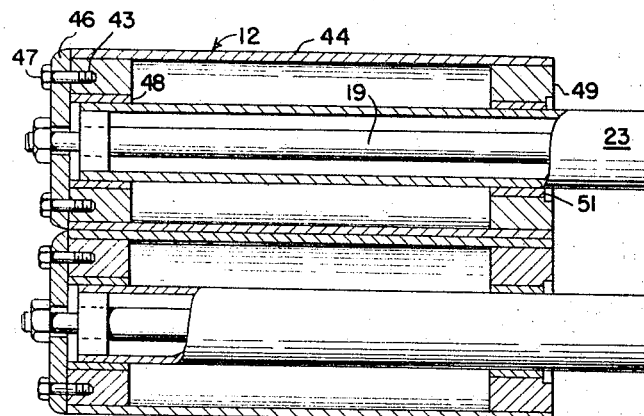
FIG. 4
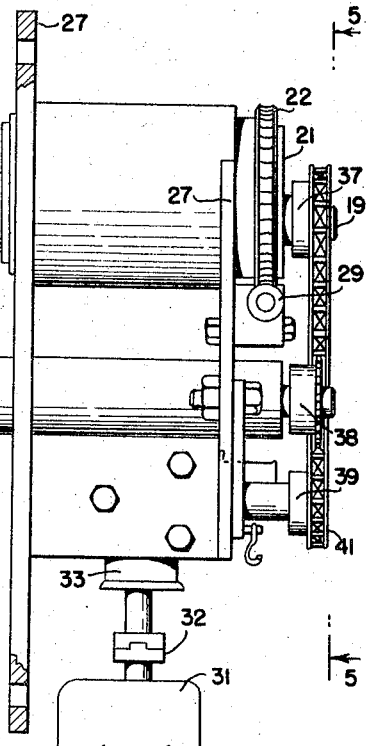
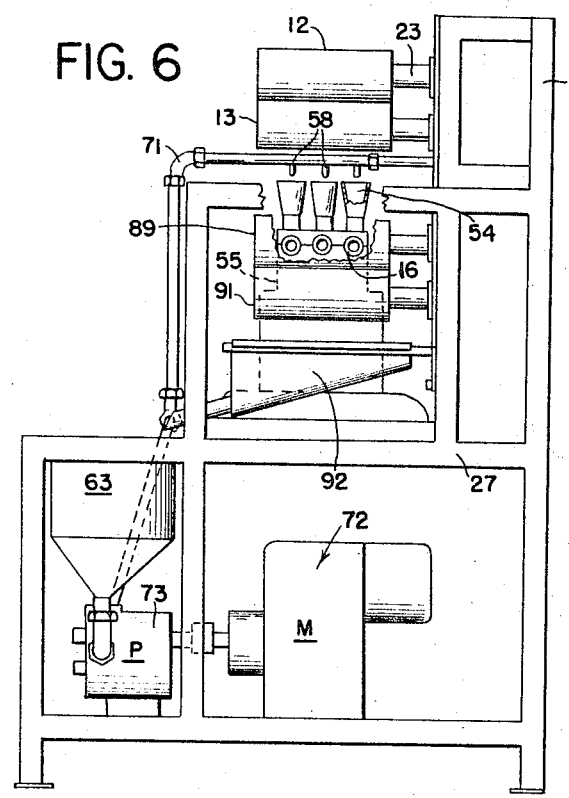
FIG. 6
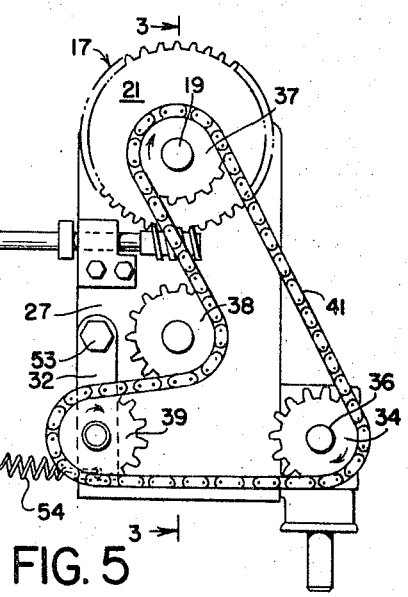
FIG. 5
INVENTORS
ROBERT C. DECHAINE
ROBERT W. CALLAGHAN
BY
Harold D. Jackram
ATTORNEY April 18, 1967 R. C. DECHAINE ETAL 3,314,356
APPARATUS FOR PROCESSING PROTEIN FIBER
Original Filed Feb. 5, 1963 4 Sheets-Sheet 4
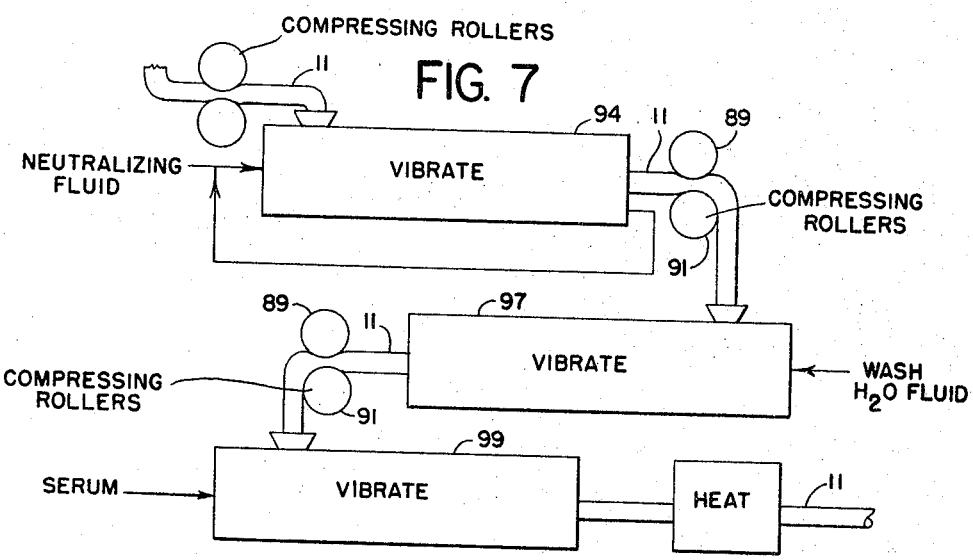
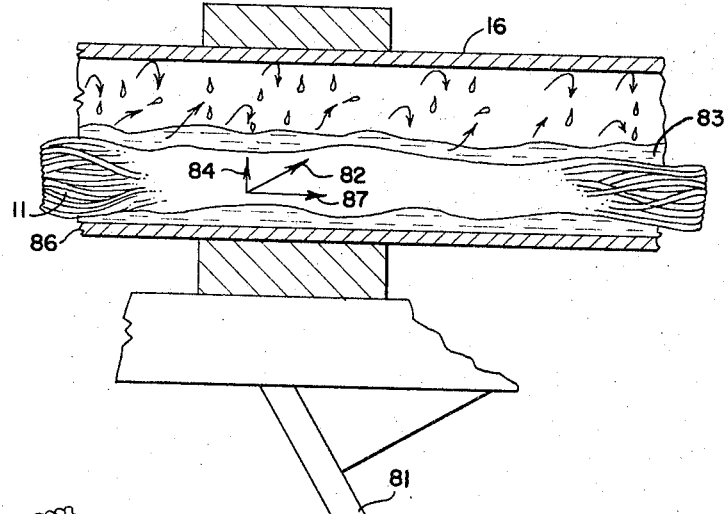
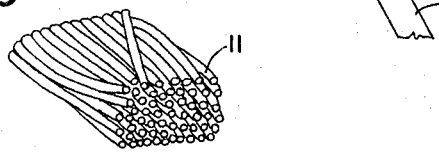
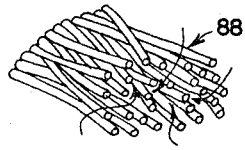
INVENTORS
ROBERT C. DECHAINE
ROBERT W. CALLAGHAN
BY
Harold D. Jastram
ATTORNEY

United States Patent Office 3,314,356
Patented Apr. 18, 1967

3,314,356
APPARATUS FOR PROCESSING
PROTEIN FIBER
Robert C. Dechaine and Robert W. Callaghan, Minneapolis, Minn., assignors to General Mills, Inc., a corporation of Delaware
Original application Feb. 5, 1963, Ser. No. 256,467, now Patent No. 3,269,841, dated Aug. 30, 1966. Divided and this application Apr. 21, 1964, Ser. No. 361,493
6 Claims. (Cl. 99—234)

This invention relates to an apparatus for treating a spun protein product, and more particularly an apparatus for treating edible fibrous protein products by vibrating the product and a bath of treating fluid.

It is well known that artificial textile fibers can be prepared from vegetable and animal protein, such as soy protein, corn protein, peanut protein, casein and keratin. It is also known that such fibers can be used to prepare meat substitutes which possess the required amount of protein and which can be made to simulate meat as to texture, flavor, and appearance. As disclosed in Boyer Patent 2,682,466, a meat substitute can be produced from edible protein material by forming protein fibers or filaments and then by suitable means, binding the fibers. These protein fibers are prepared from a spinning dope of protein which is forced through a porous membrane such as a spinneret to form fibers which are coagulated in an acid salt bath and oriented by suitable means, such as by a series of rolls revolving at increasing speeds. The fibers are placed in a salt solution such as sodium chloride of sufficient concentration to prevent the fibers from redissolving. Groups of these fibers in accordance with the method disclosed in the Boyer patent, are freed from excess liquid by squeezing or centrifuging. The fibers are mixed with a suitable binder. The individual groups of fibers are then assembled into a tow and passed through a bath of melted fat or the like, or alternatively the individual groups of fibers are treated with fat and thereafter assembled into a tow. The toughness or tenderness of the resulting product can also be controlled to a degree by the amount of stretch which is imparted to the fibers in the initial forming procedure. This stretching results in an orientation of the molecules in the protein fibers. The fiber bundles can be arranged so that they simulate the meat of mammals, fish, fowl, and shell fish.

The fibers must be further treated in order to produce a satisfactory simulated food or meat product since the product often contains a number of undesirable constituents such as acids, and the like. The bundles of fibers are often compacted so that easy processing of the entire product to effectuate cleansing, neutralization, binding, flavoring, and other processing is very difficult. The compacted fibers or filaments tend to resist the impregnation of the bundle by the various processing or treating fluids which must be used to effectively change the raw protein product to a usable meat or food substitute. Usual methods of treating such a fibrous protein product are often inefficient and do not result in a completely desirable finished product. The undesirable product results because the treating fluid, which may be a neutralizing agent, coloring material, flavoring agents, oils or the like are not satisfactorily distributed throughout the bundle of fibers.

Thorough distribution of the treating fluid throughout the fiber bundle has heretofore involved a costly and time consuming process. It is therefore highly desirable to have an apparatus whereby the fibers may be treated in a continuous manner to produce a product which satisfactorily simulates meat and which accomplishes this result in an efficient manner.

It is therefore an object of the present invention to provide a new and improved apparatus for treating fibrous protein products.

It is another object of the present invention to provide a new and improved apparatus for impregnating spun protein fiber with a treating fluid.

It is a further object of the present invention to provide a new and improved apparatus for preparing simulated meat products from a fibrous protein product.

Another object of the present invention is to provide a new and improved apparatus for treating a fibrous protein product with a fluid by agitating the product in the presence of a treating fluid.

Another object of the present invention is to provide a new and improved apparatus for impregnating edible fibrous protein products with a treating fluid by simultaneously vibrating the product and a bath of the treating fluid.

It is another object of the present invention to provide a new and improved apparatus for separating the fibers of a spun protein product by vibration of the product and bath of treating fluid to impregnate the fibers with the treating fluid while conveying the fluid and fibers the length of a treating chamber.

With these and other objects in view, the present invention contemplates immersing or combining a spun protein product in a bath of treating fluid. The treating fluid may be any number of fluids which may be used to neutralize, flavor, wash, bind, color, or otherwise treat the fibers. The combined bath of treating fluid and product is then vibrated to effectuate separation of the fibers and impregnation of the product by the treating fluid while it is moved the length of a treating chamber.

The invention contemplates a novel apparatus, which may include a receptacle or treating chamber for confining a treating fluid to form a bath. Feed rollers direct the spun protein products into the bath. A vibrator is attached to the receptacle to vibrate the bath of treating fluid and product to convey the product and fluid along the receptacle, separate the fibers of the product, impregnate the product with the treating fluid and otherwise process the product. A set of discharge rollers situated near the egress of the receptacle carries the product to a subsequent processing station. The rollers may also be used to remove excess fluid from the spun protein product. A treating fluid supply system is provided to supply the needed treating fluid.

A complete understanding of the invention may be obtained from the following detailed description of an apparatus forming specific embodiments when read in conjunction with the drawings, in which:

FIGURE 1 is a front view of an apparatus according to the present invention showing the major components of the apparatus;

FIGURE 2 is a plan view of the apparatus disclosed in FIGURE 1;

FIGURE 3 is a fractional cross section view taken along line 3—3 of FIGURE 5 showing a feed roller for the apparatus;

FIGURE 4 is a fractional cross section view taken along line 4—4 in FIGURE 1 showing feed-in rollers for the apparatus disclosed in FIGURE 1;

FIGURE 5 is a fractional view of a gear system taken along line 5—5 of FIGURE 4;

FIGURE 6 is a right end view of the apparatus disclosed in FIGURE 1;

FIGURE 7 is a flow diagram for treating spun protein products;

FIGURE 8 is a fractional cross section view showing a bundle of spun protein product in a bath which is subjected to vibratory motions;

FIGURE 9 is an isometric view of a bundle of fibers of a spun protein product which has not been treated, and FIGURE 10 is an isometric view of a bundle of fibers of a spun protein product which has been treated according to the present invention.

The spun protein product can be produced by any of a number of methods known in the art. A wide variety of protein materials which are edible can be used in preparing the product. Representative of such materials are soybean, corn, peanut, and pea proteins as well as various animal proteins such as casein. The edible protein may be prepared for example by dispersion in an alkaline medium in varying amounts, such as from about 10 to 30% by weight. A suitable alkaline medium is water containing an alkali metal hydroxide, that is about 5 to 10% by weight sodium hydroxide. The pH of the spinning solution can be varied within relatively wide limits but may generally be in the range of 9 to 13.5. The viscosity and temperature of such dispersions is generally within the range of about 10,000 to 20,000 centipoises and about 35 to 45° C., respectively. Viscosity, pH, temperature, and concentrations of alkali, metal hydroxide, and protein will vary somewhat with the particular protein being dispersed. Also, the dispersion may amount to a colloidal solution.

The dispersion of spinning dope is forced through a porous membrane, such as a spinneret used in the production of rayon, and into a coagulating bath which is generally an acid salt solution. The streamlets coming through the spinneret are precipitated in the form of filaments or fibers having a diameter of about 0.003–0.004 inch. Alternatively, coarser filaments or fibers can be produced by starting with the proteins in the form of powdered material and plasticizing them with about 25% alkaline water and then extruding the plasticized protein material through dies. The filaments of fibers produced by such a process have a much greater thickness which resemble paint brush bristles. It is also possible to have a series of spinnerets producing filaments or fibers from the protein dispersion.

The fiber product is then processed in a coagulating bath of aqueous solution of salt and an acid. The salt, sodium chloride for example, can be used in widely varying concentrations such as from 0.5 to 12% by weight. The acid can be any of those normally used in the coagulating bath. Representative acidic compounds are acetic acid, lactic acid, citric acid, adipic acid, hydrochloric acid and the like. The concentration of the acid in the bath is not critical and normally varies between about 0.5 to 10% by weight.

The filaments or bundles of fibers are then stretched by pulling them from the coagulating bath over take-up reels. A variety of methods may be used to stretch the filaments or bundles of fibers to the proper length, texture, and so forth.

The pH of the filaments or bundles of fibers leaving the coagulating bath is generally in the range of about 1.0 to 4.0 which is undesirable. Food products prepared from this protein product normally have a sour taste and are normally very dry and tough. Thus, the fibers must be further processed. This further processing includes neutralization of the product by passage of the fibers through a neutralizing bath. Refer now to FIGURE 1 of the drawings. A bundle of filaments or fibers of spun protein product 11 is engaged by a pair of rollers 12 and 13 which are designed to direct the product or tow 11 into the ingress of a tubular receptacle or chamber 16. The rollers are driven at a controlled rate of speed depending on the desired movement of the tow 11 through a chamber 16.

A vibrator 74 is connected to a base member 55 and vibrates chamber 16. Vibration of chamber 16 results in agitation of fluid and fiber in the chamber 16 to convey the fiber and fluid, separate the fibers, and impregnate the fibers with the fluid. The fiber and fluid are then discharged and the fiber tow is engaged by a pair of adjustable discharge rollers which remove excess fluid from the fibers. Rollers 89 and 91 are identical to rollers 12 and 13.

The rollers 12 and 13 are adjustable so that they may be utilized to not only direct the continuous length of tow 11 into the ingress 14 but they may also be used to remove excess fluid which may be in the tow 11 as a result of the processing through the coagulating bath. The adjustable feature of this pair of rollers or roller assemblies 12 and 13 can be readily understood by reference to FIGURES 3, 4, and 5 of the drawings where an adjusting unit 17 is shown. The shaft 19 of the roller 12 is eccentrically mounted in an end plate 21. A ring gear 22 is mounted on the outer periphery of the end plate 21 so that the end plate 21 may be rotated about its axes. The shaft 19 may be mounted in a number of well known ways in the end plate 21 so that it can rotate and drive the roller 12. A shaft sleeve 23 surrounds the shaft 19 and is rigidly mounted in the end plate 21. End sleeve 23 surrounds the shaft 19 and acts as a surface upon which the bearings for the roller 12 are mounted for rotation by the shaft 19. The shaft sleeve 23 is rigidly mounted in end plate 21 which in turn is connected to a carrier sleeve 25 which surrounds the shaft sleeve 23. Carrier sleeve 25 is mounted on bearings 26 which provide for rotary motion between the carrier sleeve 25 and the housing 27 of the apparatus. A second end plate 28 is provided opposite end plate 21 to rigidly mount the shaft sleeve 23 and provide proper support for the sleeve 23.

When a worm gear 29, which engages ring gear 22, is rotated by a power source, which is not shown, the gear 22 rotates the end plate 21, the carrier sleeve 25 attached to the end plate 21, and end plate 28. This rotation of the carrier sleeve 25 and end plates 21 and 28 results in a change in the position of the shaft 19 since the shaft 19 is eccentrically mounted in the end plates 21 and 28. Assuming that the shaft 19 is at a lowermost position in FIGURES 3 and 5, if the worm gear 29 is rotated, the rotating ring gear 22 will carry the shaft 19 and shaft sleeve 23 upwardly as viewed in FIGURES 3 and 5. Since the drum 12 is mounted on the shaft sleeve 23, the roller 12 will also move upwardly. This upward movement of roller 12 carries the roller 12 away from the roller 13 as viewed in FIGURE 1 leaving more space between the spacing surfaces of the two rollers. Thus the tow 11 which is passing between the rollers 12 and 13 is not compressed to such a great extent.

The rollers 12 and 13 are mounted for rotation on a shaft sleeve 23. (See FIGURES 4 and 5 of the drawings.) A motor 31 provides the power to operate the rollers 12 and 13. The motor 31 is connected through a universal connection 32 to a gear system 33. A drive sprocket 34 is mounted on a shaft 36 which in turn is driven through the gear system 33. The drive sprocket 34 is connected to a drum sprocket 37, drum sprocket 38, and an idler sprocket 39 by a chain 41. (See FIGURE 5 of the drawings.) As noted in FIGURE 3 in connection with the description of the adjustable feature of the rollers 12 and 13, the drive shaft 19 is mounted in plate 21 for rotation. The drive shaft is enclosed by the shaft sleeve 23.

A bearing block 43 is mounted within the roller cylinder 44 and provides a rigid connection between the roller sleeve 44 and an end plate 46. Plate 46 is attached to the end of roller sleeve 44 by bolt 47. The drive shaft 19 extends completely through the roller sleeve 44 and is connected to the end plate 46. The power from the motor 31 is directed along shaft 19 to the end of roller 12 which contains the end plate 46. Shaft sleeve 23 provides a cantilever mount for the roller 12 and is connected to the roller sleeve 44 by a bearing 48 which is mounted on bearing block 43 (see FIGURE 4 of the drawings). The shaft sleeve 23 is mounted to the other end of the roller sleeve 44 by another bearing block 49 and bearing 51 which provide a rotary connection between the sleeve 23 and roller sleeve 44. Since bearing block 43 is rigidly connected to the roller sleeve 44, the rotary motion is transferred to the roller sleeve 44 so that the roller or roller assembly 12 rotates with respect to shaft sleeve 23 on bearings 48 and 51.

Power is transferred to the roller 13 in exactly the same manner as that described with respect to roller 12 except that the chain 41 is connected to the drum sprocket 38 so that the power is transferred to the roller 13 in a direction which will permit the rollers 12 and 13 to direct the fiber tow 11 through the rollers. If the drum sprocket 37 is rotated in the clockwise direction as viewed in FIGURE 5 so that the drum 12 rotates in the clockwise direction then the belt or chain 41 must be connected to drum sprocket 38 so that roller 13 rotates in the counter-clockwise direction.

As previously noted the drum 12 may be vertically adjusted so that it may be separated from the roller 13 to provide a predetermined spacing between the rollers. When this adjustment is made by rotation of the ring gear 22 by worm gear 29, a change in the amount of chain 41 which is necessary to interconnect the various sprockets will change. To compensate for this changing length of chain 41 which is necessary to drive the system, an idler sprocket 39 is provided. (See FIGURE 5.) The idler sprocket 39 is connected to a bracket 32. The bracket is pivotally connected to the chassis 27 so that the sprocket 39 may be adjusted in an arc which pivots about a pivot point 53. Opposite the pivot point 53 a spring 54 is connected to the bracket 32 to maintain the chain taut at all times. Spring 54 tends to pivot the bracket and connected idler sprocket 39 in the clockwise direction to take up all the slack in the chain 41. When more chain 41 is needed as a result of a change in the separation of the rollers 12 and 13, the bracket 32 simply pivots in the counterclockwise direction against the action of the idler spring 54. It can be seen that this idler 39 automatically adjusts the length of the chain 41 since it is biased by the spring 54 and is not rigidly connected other than through a pivot point 53.

The tow 11 passes through the rollers 12 and 13, at a rate determined by the desired movement of the tow through chamber 16. Tow 11 is squeezed to remove excess liquid and other material to a greater or lesser degree. The tow 11 is directed into the ingress or input end 14 of a receptacle or chamber 16 which confines the tow for treatment. The ingress 14 is positioned so the tow 11 simply falls under the force of gravity into flared end 54 which is bent at an angle with respect to the longitudinal axes of the chamber 16. The opening 54 may be bent at any angle as long as it satisfactorily receives the tow 11 from the input rollers 12 and 13. As noted in FIGURES 2 and 6, there may be any required number of chambers 16 and associated flared members 54. Any number of chambers 16 may be lined up to accommodate a series of tows 11 which may be prossessed through the input rollers 12 and 13 from a previous processing system.

The chamber 16 is a tubular member such as shown in FIGURE 6. Each of the chambers 16 is mounted on a base member 55 which extends nearly the entire length of the chamber. The chamber 16 is connected to the base 55 by brackets 56. These brackets 56 may be hinged to the base 55 or they may simply be bolted to the base 55. In the case where several of the chambers 16 are utilized in the same machine to accommodate a number of tows passing between the rollers 12 and 13, a single base member 55 may be used to accommodate the series of receptacles or chambers 16. The chambers 16 are positioned on the base member 55 so that the ingress 14 is slightly elevated above the egress 57. This slight elevation of the ingress aids the flow of the tow and associated liquid to the egress. Slight elevation of the ingress is not absolutely essential, however, since a vibrator system is utilized to advance the tow 11 and accompanying liquid through the chamber 16 and conveyance is possible without the aid of gravity.

Simultaneously with the direction of the tow 11 into the flared portion 54 of the chamber 16, treating fluid is introduced into the ingress 14 through an input nozzle 58. The treating fluid is combined with the tow 11 at the ingress so that the tow 11 is treated during the entire length of time that the tow 11 and the treating fluid flow along the enclosed or tubular chamber 16. The treating fluid which is introduced into the ingress 14 may be any one or more of a number of fluids which can be utilized to treat the fibrous protein product 11 to obtain a desired finished product. As an example, if the fiber or tow 11 is to be neutralized to raise the pH of the product from 1.0 to 4.0 up to a range of about 4.5 to about 7.0, the neutralizing agent may be a salt solution containing an alkali metal hydroxide or bicarbonate. The treating fluid may also be an alkaline agent other than alkali metal hydroxide. Particularly good results are obtained by using aqueous solutions of alkali or alkaline earth metal sulphites. The neutralization may also be carried out by simply using water to wash the tow 11. The treating fluid, which may be water, is simply introduced with the tow 11 to wash the product. On the other hand the treating fluid which is introduced at the ingress may be such materials as binders, flavoring agents, coloring agents, and the like. Suitable binders including edible materials such as starches, cereals, dextrins, proteins, gums, alginates, and the like may be used. Preferably, if a binder is involved, the binder is heat coagulable protein such as albumen. Various meat flavors which are available commercially can be added as the treating fluid. Representative thereof are bouillon cubes having chicken, beef, and other meat flavors. Synthetic ham, bacon, and sausage flavors may also be added as the treating fluid. Additionally, the treating fluid may contain a variety of spices, salts, and other flavoring agents.

Vegetable oils and animal fats and oils can also be added to the fibers. Represenative thereof are soybean oil, cottonseed oil, corn oil, coconut oil, palm kernel oil, olive oil, peanut oil, sesame seed oil, tallow, lard, chicken fat, butter, cod liver oil, and the like.

Thus it can be seen that the treating fluid which is introduced through the nozzle 58 can be any number of fluids utilized to process the tow 11 so that a particular product having unique characteristics will result from the treatment. The treating fluid is stored in a tank 61 which is mounted on the chassis 27. The treating fluid 62 is deposited in a collection hopper 63 of the fluid system 64. A valve 66 is provided to meter the treating fluid 52 from the tank 61 into the hopper 63. The metering device 66 is illustrated as a simple valve, however it may be any number of commercially available metering systems connected in the supply line 67. The fresh treating fluid which comes from tank 61 together with used treating fluid which flows into the hopper 63 through line 68, is pumped by the pump system 69 into a line 71. Line 71 supplies the nozzles 58 at the input end or ingress 14 of the chamber 16. The pump system 69 includes a motor 72 which operates a fluid pump 73 for pumping the treating fluid at a predetermined rate into the ingress 14 of the chamber 16. The line 71 acts as a supply line both for fresh liquid 62 and for used liquid which is coming from the chamber 16. In other words, supply line 71 is a feedback line with respect to the used fluid which is returned to the ingress of the chamber 16. This feature permits reuse of the treating fluid and reduces the amount of used fluid which must be disposed of in the satisfactory operation of the system.

The tow 11 which enters the ingress 14 of the chamber 16 has a number of fibers which are closely compacted. This compaction of the fibers in the tow 11 results due to the squeezing effect on the tow as a result of passage through rollers 12 and 13. The compacted fibers appear substantially as shown in FIGURE 9 of the drawing. The fibers are randomly distributed in the tow but are squeezed relatively close together so that impregnation of the inner fibers by a treating fluid is relatively difficult if not impossible to accomplish. This close compaction of the fibers results in a number of problems with regard to neutralization, coloring, flavoring and other treatment of the inner fibers of the tow 11. We have found that the most successful way of assuring that the tow is properly impregnated with the treating fluid for neutralization, coloring, flavoring, and other purposes is to loosen the tow or separate the individual fibers of the tow so that the treating fluid may flow in and around each individual fiber.

In order to accomplish satisfactory separation of the fibers and impregnate the tow with the treating fluid, we have used a vibratory system and preferably one in which the chamber 16 is supported for rapid conveying vibrations along a path having both longitudinal and vertical components. Thus the vibrations cause the chamber to exert an effective conveying force on all portions of the tow as well as an effective agitating and impregnating force. A commercially available vibrator generally designated by a number 74 is connected to the base 55 and frame 27 to provide the vibratory oscillations for the chamber 16. The motor 76 of the vibrator 74 is connected to the base 55 by a bracket 77. The stationary portion 78 of the motor 76 is connected to a frame 79 which in turn is bolted to the chassis of the machine 27. The oscillating portion of the motor 76 moves in the direction indicated by the arrow in FIGURE 1 of the drawings. This vibratory motion is at an angle with respect to the longitudinal axis of the chamber 16. A spring 81 forms another portion of the vibratory supporting system for chamber 16. This spring member 81 is connected to the base member 55 and the frame 79. The spring 81 cooperates with the motor 76 to provide the desired vibratory motion of the base 55 and chamber 16.

Refer now to FIGURE 8 of the drawings where there is shown a fractional cross section of the tubular chamber 16 disclosed in FIGURE 1. The motor 76 of the vibrator sets up oscillatory motions or vibrations having a resultant vector force 82 across the axes of the tubular chamber 16 as shown in FIGURE 8. After the tow 11 and the treating fluid 62 are introduced into the ingress 14 of the chamber 16, a bath 83 of the treating fluid 62 is formed about the tow 11 within the chamber 16. As noted from the vector diagram in FIGURE 8, the vibrator 74 sets up vibratory motions which have force components which are vertical to the longitudinal axis of the chamber 16 and also parallel to the longitudinal axis of the tow 11 and chamber 16. The vertical vector component 84 tends to force the tow 11 vertically upward within the chamber 16 and in the bath 83 away from the bottom surface 86 of the chamber 16. Thus even though the tow 11 may not be buoyant enough to float in the bath 83, the force which is perpendicular to the longitudinal axes of the tow 11 and chamber 16 will tend to maintain the tow 11 in a suspended position within the fluid bath 83. This suspension of the tow 11 insures that treating fluid completely surrounds the tow 11 and provides for more efficient impregnation of the tow 11 by the treating fluid as the fluid is also agitated by the vibratory system.

A component of force which is parallel to the longitudinal axis of the tow 11 and chamber 16 also exists within the vibrated chamber 16. This force is represented by the force vector 87. Vector 87 tends to convey the liquid of the bath 83 and the tow 11 to the right as indicated in FIGURE 8. The vibratory motion provides a means of conveying the tow 11 from the ingress 14 to the egress 57 of the chamber 16 without the necessity of tensioning the tow to pull it thorugh the bath by rollers or other means of conveyance. The magnitude of the oscillatory motion may be adjusted by the usual method in a (syntron) vibrator to provide satisfactory movement of the tow 11 and treating fluid through the chamber 16 and to provide adequate agitation or vibration of the tow 11 and bath 83.

The amplitude of the vibration should, however, be great enough to agitate the tow 11 and separate the various fibers so that the treating fluid will impregnate the tow 11. The individual fibers of a fibrous product normally have some tendency to separate when the product is suspended in a fluid without tension. However this dispersion or separation of the filament is quite often not adequate to insure complete impregnation of the product. Failure to contact the center fibers of a bundle results in the case where the individual fibers do not adequately separate. The vibratory motion of the bath 83 and tow 11 however provides adequate movement of the individual fibers so that the fibers separate one from the other to permit the treating fluid to contact all fibers in the tow 11. Additionally the agitation or vibration of the bath 83 also insures that the treating fluid itself moves in and around the individual filaments or fibers of the tow 11 as indicated by the arrows 88 in FIGURE 10 of the drawings. Thus it can be seen that with the vibration of the bath 83 and the tow 11, the fibers or filaments of the product are forced apart so that treating liquid may contact each fiber in the tow. Simultaneously, the treating fluid is agitated adequately to force the fluid to flow in and about the individual fibers for complete impregnation of the tow 11. The agitation of the tow 11 to separate the individual fibers has the additional advantage of fluffing the product so that the product which flows out of the chamber 16 is much more fluffy than the compact product which enters at the ingress 14 of the chamber 16.

The tow 11 travels along the length of the chamber 16 and exits at the egress 57 of the chamber where the tow 11 is engaged by a pair of discharge rollers 89 and 91. The discharge rollers 89 and 91 are exactly like the input rollers 12 and 13. The discharge rollers 89 and 91 are adjustable so that the spacing between the rollers may be varied to compress the tow 11 to a desired degree. The drive mechanism and the adjusting features of the rollers 89 and 91 are exactly the same as those discussed in connection with the rollers 12 and 13, consequently no additional discussion appears necessary concerning these particular aspects of the discharge rollers. The discharge rollers 89 and 91 are adjusted, under normal conditions, in such a manner that excess treating fluid which has impregnated the tow 11 is forced or squeezed from the tow 11. Removal of excess treating fluid is often desirable since the tow 11 often is conveyed to subsequent processing stages where excess treating fluid in the tow 11 is not needed or desired. The rate of rotation of the discharge rollers 89 and 91 is fixed so that the peripheral velocity of the rollers is approximately equal to the longitudinal velocity of the tow 11. The velocity of the tow 11 is determined by the amplitude, frequency and direction of the vibratory forces generated by the (syntron) vibrator 74. The tow 11 also tends to flow from the egress 57 to some extent under the influence of gravity provided the chamber 16 is elevated at its ingress 14. However, as previously noted, elevation of the ingress is not essential to the efficient operation of this system since the force component generated by the (syntron) vibrator 74, which is parallel to the longitudinal axis of the tow 11 is adequate to convey the tow 11 along the length of the chamber 16.

Since the bath 83 of treating fluid is vibrated by the (syntron) vibrator 74, the treating fluid is also discharged at the egress 57 of the chamber 16 along with the tow 11. This treating fluid which is discharged together with treating fluid which is squeezed from the tow 11 by the rollers 89 and 91 is deposited in a funnel shaped fluid collector 92 from which it is directed through opening 68 into the fluid hopper 63. This discharged treating fluid is then returned to the pump system 69. The amount of treating fluid which is collected by the fluid collector 92 is considerably less than the amount of fluid which is directed into the ingress 14 of the chamber 16. This is the case since the tow 11 carries a considerable quantity of the treating fluid with it even after it has been squeezed. The fresh treating fluid 62 is metered as previously noted into the hopper together with the reclaimed treating fluid and is directed to the pump system 69. The pump system then returns the combined fresh treating fluid and reclaimed treating fluid to the ingress 14 through a line 71 where the reclaimed fluid is reused in the system. The amount of fluid which is directed into the ingress 14 of the chamber 16 is controlled by controlling the rate of pumping. Thus the level or depth of the bath 83 in the tubular chamber 16 is controlled within relatively accurate limits by simply controlling the amount of fluid which is pumped by the pump system 69.

The apparatus for treating the tow 11 can be utilized in a number of ways to process the tow 11 to produce a finished product. As previously indicated if the fiber of tow 11 is acidic, the treating fluid may be one of a number of liquids which are basic. This basic treating fluid is utilized in the chamber 16 to form the bath 83 so that the pH of the tow 11 may be raised from an unacceptable range of from 1 to 4 to a more acceptable range for a meat product between 4.5 to about 7. When the apparatus is utilized to accomplish this neutralization of the fibers, the treating fluid such as a solution containing an alkali metal hydroxide as previously noted, is introduced into the ingress 14 of the chamber 16. After the treating fluid is combined with the tow 11, the tow and treating fluid pass through the main body of the chamber 16 where a bath 83 of the treating fluid is formed within the chamber 16. Next the vibrator 74 vibrates the bath 83 and combined tow 11 so that the fibers of the tow 11 are separated by the vibrating action of the bath 83 and tow 11. The vibratory action also agitates the bath sufficiently so that the treating fluid is forced into and about the individual fibers of the tow 11 as disclosed by the arrows 88 in FIGURE 10. Simultaneously with this vibration and impregnation of the tow 11 by the treating fluid, which is neutralizing fluid in this case, the tow 11 is conveyed along the length of the chamber 16 by the force component which is parallel to the longitudinal axis of the tow 11 and chamber 16. This force component also conveys the treating fluid of bath 83 with the tow 11. At the termination of the vibration when the tow 11 and the treating fluid exit from the egress 57 of the chamber 16, the treating fluid is separated from the tow 11 by the force of gravity. The treating fluid falls into the fluid catch 92 where it is discharged. Excess fluid is then removed by the rollers 89 and 91. The tow 11 is thus neutralized in the basic treating fluid and is now ready for further processing in the event additional steps must be taken to produce a finished product.

A more specific example of the neutralizing step is illustrated by an acidic protein product fiber which is fed into the ingress 14 together with a treating fluid which is a 0.1 to 1.0% solution of $Na_2SO_3$. The fiber and treating fluid are vibrated and the tow is thoroughly saturated by the sulfite solution. This treatment of the acidic protein product with the sulfite solution will raise the pH of the product from the initial 3.0–3.2 range to a pH of from 5.5 to 6.0. When the above described apparatus is utilized to accomplish the vibration, the time necessary to effectuate the neutralization is considerably reduced. In the instant example, the time is reduced from a usual 4 to 10 minutes to 30 seconds.

After the neutralizing step previously described, the filaments may then be freed from excess neutralizing solution by washing or similar processing. It is possible to simply water wash the tow 11 in a bath of water to remove excess basic treating fluid. However, it is possible to connect, in tandem, another apparatus such as that described with the apparatus which has accomplished the neutralizing step. In this situation the second apparatus which is connected in tandem is placed so that its input rollers 12 and 13 are adjacent the output rollers 89 and 91 of the previous apparatus. The tow 11 is then directed into a chamber 16 of the second apparatus and combined with a washing liquid such as water to form a bath 83. The step previously described of vibrating the tow and bath 83 to convey the tow along the length of the chamber 16 and separate the fibers is then repeated. The water of the washing bath impregnates the fibers of the tow 11 due to the vibratory action of the second vibrator so that all excess treating fluid is removed from the tow 11. The water wash or other washing fluid is then separated from the tow 11 in the same manner as the basic treating fluid was separated from the tow during the neutralization step.

A combination of this neutralization and washing process may be observed in FIGURE 7 of the drawings where a tow 11 is combined with a neutralizing fluid such as one of the basic fluids previously described. The combined neutralizing fluid and tow 11 are vibrated to separate the fibers of the tow 11 and impregnate the tow 11 with the treating fluid. The vibration and conveyance of the tow 11 along the length of a chamber such as chamber 16 occurs simultaneously and the tow 11 exits from the chamber 16 and is separated from the treating fluid. The tow 11 is then squeezed by a pair of rollers 89 and 91 (using the same number system as set forth in connection with the apparatus) where it is directed for further processing.

Next the tow 11 is combined with a washing fluid. The combined tow 11 and bath of washing fluid is then vibrated as disclosed by block 97 to accomplish the impregnation, conveyance, and separation of the fibers of the tow 11. Again the tow 11 is separated from the treating fluid, washing fluid in this case, and is squeezed by a set of squeezing rollers 89 and 91. It should be understood that the washing step may be omitted provided the tow 11, as it emerges from the neutralization step, is of a proper pH level for ultimate use as a food product or other product. The washing will only be necessary when the basic fluid used for treating the tow 11 in the neutralization step contains some undesirable characteristic such as an obnoxious odor, unusual taste, or other damaging characteristics.

After neutralization and washing the filaments are impregnated with binders, flavoring agents, and the like if the tow 11 is to be made or processed into a suitable food product. Suitable binders include edible materials, such as starches, cereals, dextrins, proteins, gums alginates, and the like. Again a third apparatus may be connected in tandem with the previous apparatus which performs the washing step. As previously noted in connection with the neutralizing and washing step, the treating fluid is combined with the tow 11. The binders and flavoring agents are then formed in a bath 83 with the tow 11. The bath 83 and tow 11 are again vibrated by the vibrator 74. Vibration of the bath 83 and tow 11 results in separation of the fibers in the tow 11 and impregnation of the tow 11 by the various binders and flavoring agents to insure a uniform distribution of the binder and flavoring agents throughout the cross section of the tow 11. Again the tow 11 is simultaneously conveyed, vibrated and impregnated by the treating fluid as it travels along the length of the treating chamber 16. As previously noted, in connection with the neutralization and washing steps, excess binding and flavoring agents may be removed from the tow 11 by simple gravitational separation of the tow 11 and the binding and flavoring agents at the egress end of the chamber 16. A number of other materials can be utilized to treat the tow 11. For instance, oils, fats and other materials may be subsequently added to the fibers separately. Thus, the fibers can first be passed through a bath containing a binder and preferably also, the flavoring agents. The fibers can then be passed through a bath of an oil such as those previously described or melted fat. It is also understood that the individual fibers or bundles of different sizes can be treated with the above described agents to simulate meats of different textures.

On the other hand, the binders, flavoring agents, and oils or fats can be applied to the fibers in a single operation or step. Thus, the various additives, including binders, flavoring agents, and so forth can be emulsified, and the fibers can be passed through the emulsion to provide an even distribution of the binders, fat, and flavoring agents in the simulated meat products. An edible emulsifier can be used to prepare the additive emulsion. Representative of such emulsifiers are: mono- and diglycerides of fatty acids, such as monostearin, monopalmitin, monoolein, and dipalmitin; higher fatty acid esters of sugars, such as sucrose partial palmitate and sucrose partial oleate; phosphoric and sulfuric acid esters, such as dodecyl glyceryl ether sulfates and monostearin phosphate; partial esters of glycerol and both higher and lower fatty acids, such as glyceryl lactopalmitate; and polyoxyalkylene ethers of fatty esters of polyhydric alcohols, such as the polyoxy ethylene ethers of sorbitan monostearate and sorbitan distearate.

Dyes and pigments or other coloring material may also be added to the fibers along with the binders, flavoring agents and oils and fats. The dyes and the like may be added at any state of the fiber preparation. Thus they can be added with the other additives previously described.

It is to be understood that the above described arrangements are simply illustrative of the application of the principles of the invention. Numerous other arrangements may be readily devised by those skilled in the art which will embody the principles of the invention and fall within the spirit and scope thereof.

The embodiments of the invention in which an exclusive property or privilege is claimed are defined as follows:

1. A vibratory apparatus for treating edible spun protein fibers which comprises means for confining said fibers, means for introducing said fibers into said means for confining, means for introducing a treating fluid into said means for confining, and means for imparting vibratory movements having vertical and horizontal components to said means for confining to agitate and convey said fibers and treating fluid along said means for confining.

2. An apparatus in accordance with claim 1 in which said means for confining includes a tube having the input end bent at an angle with respect to the longitudinal axis of the tube to facilitate introduction of said fibers into said tube.

3. A vibratory apparatus for treating edible spun protein fibers which comprises a longitudinally extending enclosed processing chamber having an inlet and an outlet longitudinally spaced from each other, means for feeding a tow of edible spun protein fiber into said inlet, means for feeding a treating fluid into said inlet, and means for rapidly vibrating said chamber at a frequency, amplitude, and direction causing conveying movement of said tow and treating fluid from said inlet to said outlet.

4. A vibratory apparatus for treating edible spun protein fibers which comprises means for confining said fibers, means for extracting fluid from said fibers and for directing said fibers into said means for confining, means for introducing a treating fluid into said means for confining, a chassis, a vibrator mounted on said chassis for imparting vibratory movements to said means for confining to agitate and convey said fibers and treating fluid along said means for confining, and means for carrying said fibers away from said means for confining and for removing excess treating fluid from said fibers.

5. An apparatus in accordance with claim 4 which further includes means associated with said means for introducing for returning treating fluid removed from said fibers for re-introduction into said means for confining.

6. A vibratory apparatus for treating a continuous length of edible spun protein fibers comprising a base, a tube having an ingress and egress and mounted on said base with the ingress elevated above the egress, roller means for directing said product through said ingress, a chassis, vibratory means mounted on said chassis for importing vibrations having vertical and horizontal components to said base and tube to agitate and convey said fibers, means for introducing a treating fluid through said ingress, and a pair of closely spaced and adjustable rollers near said egress for removing said fibers from said egress and for removing excess treating fluid from said product.

References Cited by the Examiner

UNITED STATES PATENTS

| | | | |
|---|---|---|---|
| 663,452 | 12/1900 | Maertens | 68—22 X |
| 718,651 | 1/1903 | McConville | 68—207 X |
| 786,264 | 4/1905 | Butterworth | 68—22 |
| 1,403,126 | 1/1922 | Lyth. | |
| 2,222,777 | 11/1940 | Linke. | |
| 2,241,646 | 5/1941 | Rathjens. | |
| 2,545,445 | 3/1951 | Chatterton | 68—207 X |
| 2,773,375 | 12/1956 | Cox | 68—205 |
| 2,800,682 | 7/1957 | Dooley | 68—181 X |
| 3,135,190 | 6/1964 | Lewis | 99—443 |

IRVING BUNEVICH, *Primary Examiner.*

WALTER A. SCHEEL, *Examiner.*